2,876,075

FLUORINE FLUOROSULFONATE AND PROCESS FOR PRODUCING SAME

George H. Cady, Seattle, Wash., and Francis B. Dudley, Armidale, New South Wales, Australia No Drawing. Application May 29, 1956
Serial No. 587,920

9 Claims. (Cl. 23—203)

This invention relates to fluorine fluorosulfonate, a compound of the formula $SO_3F_2$, together with a process for producing it.

One object of the invention is to provide a novel compound of fluorine, oxygen and sulfur, said compound being a stable and powerful oxidant capable of existing as a liquid within a temperature range convenient for use.

A second object of the invention is to provide an effective method for preparing the above compound.

It has heretofore been known that the elements fluorine, oxygen and sulfur are found combined together in the compounds thionyl fluoride ($SOF_2$), thionyl tetrafluoride ($SOF_4$) and sulfuryl fluoride ($SO_2F_2$) but the compound, fluorine fluorosulfonate, has not been known. Boiling points of these substances are respectively: $SOF_2$, −30° C.; $SOF_4$, −48° C.; $SO_2F_2$, −52° C.; $SO_3F_2$, −31.3° C. Of these, fluorine fluorosulfonate is the most powerful oxidizing agent, being capable of forming oxygen by reacting with an aqueous solution of sodium hydroxide. It is more easily liquefied than the others, with the exception of thionyl fluoride. It can be safely handled as a liquid at room temperature under moderate pressure. In general thionyl fluoride, the other compound of equally low volatility, acts as a reducing agent rather than an oxidizing agent. Fuorine fluorosulfonate is of potential value as an oxidant for fuels in rocket propulsion. Since fluorine fluorosulfonate contains an hypofluorite group (O—F), known to be highly toxic, and since its hydrolysis also gives rise to hydrofluoric acid, it follows that fluorine fluorosulfonate may be used as a poisonous gas for germicidal, insecticidal or other purpose. Because of its convenient liquid range and its stability, it may be more safely handled than any other known hypofluorite. Most of the known hypofluorites are explosive.

Fuorine fluorosulfonate is also useful as a chemical reagent for producing other compounds. It can behave either as a fluorinating agent or as a reagent which introduces fluorosulfonate groups into molecules. For example, it has been found to combine with sulfur trioxide to form a substance of the formula $S_2O_6F_2$ which appears to have the structure

In general the hypofluorites are active reagents. Because of its stability and relative ease of handling, fluorine fluorosulfonate should be more useful than most of the others.

Properties of fluorine fluorosulfonate and its method of preparation are disclosed in a paper by the inventors and their research colleague, David F. Eggers, Jr., in the Journal of the American Chemical Society, vol. 78, pp. 290–292 (1956).

Fluorine fluorosulfonate may be prepared by causing sulfur trioxide vapor to react with fluorine at a temperature of 175° C. or more, the fluorine being present in excess of the amount consumed by the reaction.

A specific preparative method of the inventors involved an electrically heated cylindrical reaction vessel made from a piece of copper tubing having an internal diameter of three inches and a length of three feet. This was packed with ten pounds of copper ribbon of 0.018 inch width and .002 inch thickness. The ribbon was uniformly plated with silver having a total weight of one fourth pound. This ribbon was packed as a tangled mass into the reactor and it filled the reactor from end to end. The ends were then closed by copper plates fastened tightly in place with silver solder. Three copper tubes of ¼ inch diameter to be used as inlets or outlet for gas streams were attached to the reactor. Two of these were inlet tubes located near one end of the reactor and on diametrically opposite sides of the cylinder. The outlet tube was attached at the opposite end of the reactor from the inlets. The temperature of the vessel was controlled by regulating the flow of electricity through two coils of nichrome ribbon used for electrical heating. Asbestos paper was used for thermal insulation and for electrical insulation to prevent contact of the heating coils with the reactor. Before using the reactor, fluorine was passed into it at 200° C. until unreacted fluorine emerged through the outlet tube. In this way the silver present in the vessel was converted to silver difluoride.

When operating the reactor to produce fluorine fluorosulfonate, a stream of fluorine diluted with nitrogen was caused to enter one inlet and a stream of sulfur trioxide vapor diluted by nitrogen was caused to enter the other inlet. Both streams flowed simultaneously and the reactor was held at a temperature between 200° C. and 230° C. The flow rates of fluorine and nitrogen were regulated by valves on cylinders containing the gases. One of the nitrogen streams flowed at a rate of 5 liters per hour and was passed over a mass of the solid polymer of sulfur trioxide at room temperature. In this way the nitrogen became mixed with sulfur trioxide vapor and this mixed gas entered one inlet of the reactor. The other nitrogen stream flowed at an average rate of 3 liters per hour and to it fluorine was added. This mixture entered the second inlet of the reactor. As the product gases left the reactor they were passed through a glass trap cooled externally by liquid oxygen. Crude fluorine fluorosulfonate condensed in the trap, but nitrogen and unreacted fluorine passed through. The presence of fluorine in the gas flowing from the trap could be detected by its odor or by its reaction with potassium iodide solution. Paper moistened with potassium iodide solution was used for the test. When this paper was held in the stream of gas emerging from the trap, it turned brown (due to free iodine), if fluorine were present. In operating the system, care was taken to pass fluorine at a rate high enough to constantly have fluorine emerging from the condenser trap. This meant that an excess of fluorine over that required for reaction with sulfur trioxide was present in the reactor.

To refine the crude fluorine fluorosulfonate obtained in this way, the product was fractionally distilled in conventional laboratory apparatus. In addition to fluorine fluorosulfonate, sulfuryl fluoride was found to be present in the distillate.

In one run using the above procedure 13.8 grams of sulfur trioxide was caused to react. From this an 8.4 gram quantity of refined fluorine fluorosulfonate was obtained.

It has also been found possible to produce fluorine flucrosulfonate by passing fluorine over sulfamic acid held in a nickel tube at 200° C.

On the basis of work done by the inventors there is neither reason to feel that any particular form of reaction vessel is required to produce fluorine fluorosulfonate nor that the reaction of sulfur trioxide with fluorine occurs only in the presence of a mass of copper ribbon coated with silver fluoride. It is necessary, however, that the temperature of the reaction vessel be well above that of the room. Temperatures of 175° C. to 280° C. are known to be satisfactory.

The compound, fluorine fluorosulfonate, has been recognized as a new substance by analysis and by its properties. Eight measured values for the vapor density ranged from 117.0 to 119.5 with an average of 118.6 grams per gram molecular volue. (Theoretical for $SO_3F_2$ is 118.0). Analyses gave the values: sulfur 26.1, 27.03, 26.6, 26.4% by weight; fluorine 31.5, 31.3, 32.0, 31.4%. Theoretical: sulfur, 27.1%; fluorine, 32.2%. Other observed physical properties are: boiling point, −31.3% C.; melting point, −158.5° C.; density of the liquid, 1.7844 grams per milliliter at −74.05° C. The nuclear magnetic resonance spectrum for fluorine in the compound has two peaks. These indicate that the fluorine atoms are not alike in the molecule and strongly suggest that one fluorine atom is attached to the sulfur atom and one to an oxygen atom as shown in the structural formula

The gas reacts at room temperature with a solution of sodium hydroxide liberating oxygen and leaving in solution fluoride and fluorosulfonate ions. It reacts with a solution containing iodide ion and forms free iodine.

Although only certain forms of the invention have been described, those skilled in the art will recognize that numerous modifications may be made in the procedure for preparing fluorine fluorosulfonate without departure from the spirit of the invention or the scope of the appended claims.

What we claim is:

1. As a new chemical compound, fluorine fluorosulfonate ($SO_3F_2$).

2. A process of producing fluorine fluorosulfonate which comprises contacting fluorine and sulfur trioxide at temperatures in excess of 150°.

3. A process as defined in claim 2 in which the fluorine is used in excess of the amount consumed by reacting with sulfur trioxide.

4. A process as defined in claim 2 in which the vapors from the reaction are cooled to a temperature below −31° C. to condense fluorine fluorosulfonate.

5. A process as defined in claim 4 in which the condensed product is refined by fractional distillation, thereby giving fluorine fluorosulfonate of high quality.

6. A process as defined in claim 2 in which the reactants are mixed with an inert gaseous diluent.

7. A process of producing fluorine fluorosulfonate which comprises contacting fluorine and sulfur trioxide at temperatures within the range 200° C. to 230° C.

8. A process as defined in claim 2 in which the gases are contacted in a reaction vessel containing a porous mass of finely divided copper coated with silver difluoride.

9. A process in which streams of fluorine and sulfur trioxide, each diluted with nitrogen, the fluorine being used in excess of the amount consumed by reaction with sulfur trioxide, are mixed in a vessel containing a porous mass of finely divided copper coated with silver difluoride at a temperature within the range 200° C. to 230° C., and the reaction product is cooled to −31° C. or below to obtain a crude condensate which is refined by fractional distillation yielding the compound fluorine fluorosulfonate.

No references cited.